March 19, 1963  E. R. GIEZENDANNER  3,081,558
STATIC ELECTRICITY APPARATUS
Filed April 17, 1961
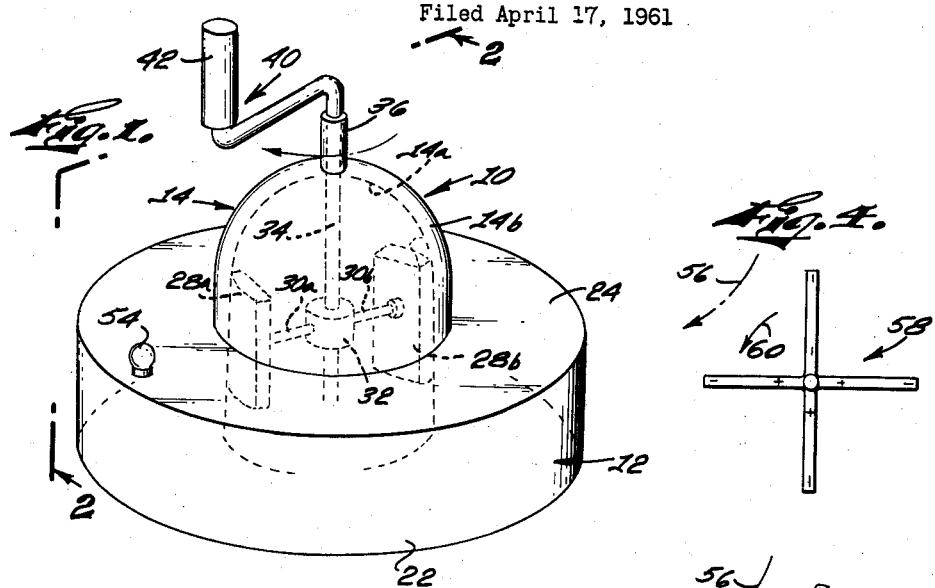
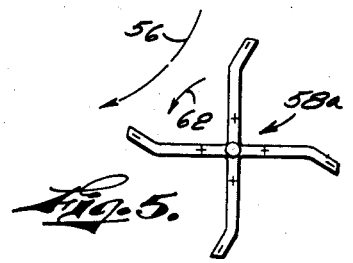
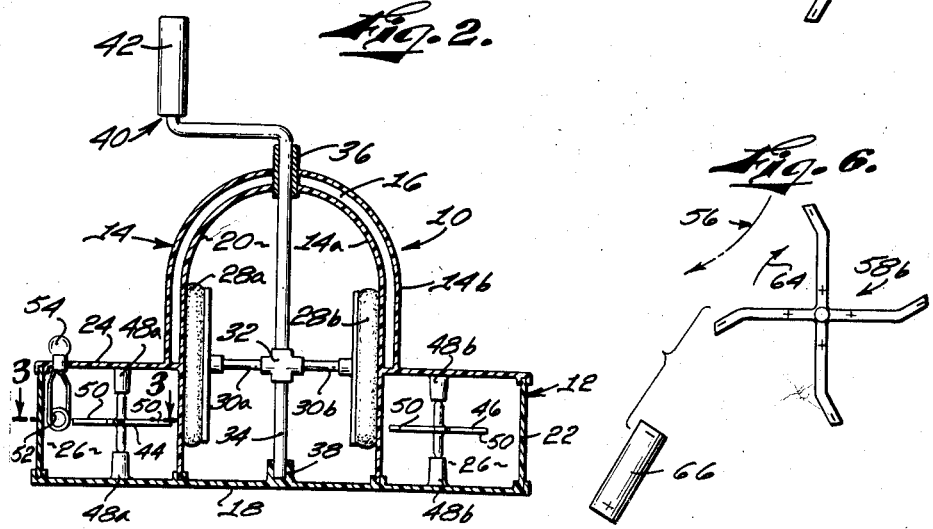
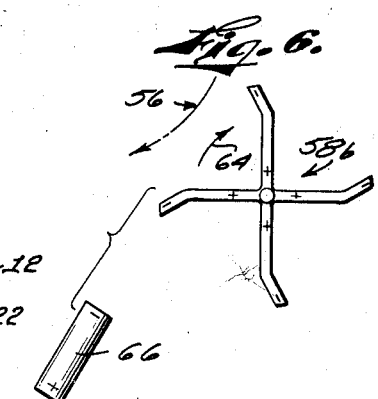
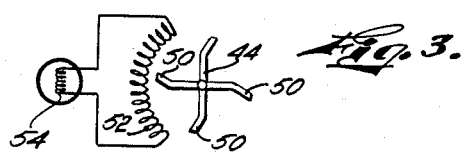
INVENTOR.
EDWIN R. GIEZENDANNER
BY FULWIDER, MATTINGLY
& HUNTLEY
ATTORNEYS

United States Patent Office 3,081,558
Patented Mar. 19, 1963

3,081,558
STATIC ELECTRICITY APPARATUS
Edwin R. Giezendanner, 5237 N. Adenmoor,
Lakewood, Calif.
Filed Apr. 17, 1961, Ser. No. 103,606
3 Claims. (Cl. 35—19)

The present invention relates generally to static electricity apparatus and more particularly to a device for demonstrating the effects of generated static electricity on different materials and structure.

Static electricity can be produced by rubbing almost any substance together with another dissimilar substance. Both metallic bodies and non-metallic bodies can be electrified by friction (i.e., rubbing). However, metallic bodies must be suitably isolated by insulating means in order for them to retain their charge. Moreover, non-metallic bodies which are essentially non-conductors of electricity can be more easily electrified by friction than the metallic bodies. The non-conductors are able to retain the static electricity produced thereon much better than the conductors (metallic bodies) which have a higher leakage factor. The greater charge produced on non-conductors results in fairly high voltages on such bodies and can be dissipated through various mediums.

The effects of static electricity can be graphically demonstrated through apparatus which produce visible and tangible results. In the past, only simple apparatus has been employed for teaching and demonstrating the phenomena of static electricity. For example, it is commonly shown that if a glass rod which has been rubbed with silk is brought near another glass rod which has been similarly rubbed and suspended on a silk thread, the two electrified rods repel each other. However, if a hard rubber rod which has been rubbed with a cat's skin is brought near the suspended glass rod, the two rods will attract each other. Such demonstrations show that bodies which are similarly charged repel each other, and bodies which are oppositely charged attract each other. Another very common demonstration is to bring a charged body near a water fixture, for example, and show that a spark will jump across the gap, discharging the charged body. While there are other more complex apparatus for demonstrating the effects of static electricity, such apparatus has been limited mainly to laboratory uses.

It is an object of this invention to provide static electricity apparatus for visibly and tangibly demonstrating the generation and various effects of static electricity.

Another object of this invention is to provide means which demonstrate the production of mechanical motion from static electricity.

A further object of the invention is to provide means for demonstrating the production of visible light from static electricity.

A still further object of the invention is to provide static electricity apparatus which is particularly suitable and useful as an educational toy.

Briefly, and in general terms, the foregoing and other objects are preferably accomplished by providing a structure including a dome section and base section, means for rubbing a surface of the dome section, and one or more rotors which are rotatably mounted in the base section. The rubbing means charges the rubbed surface and the resultant static electricity which is produced thereon causes motion of the rotors. The dome section can also include a sealed fluorescent material coated chamber which is filled with an inert gas such that the generated static electricity causes visible electrical discharges therein. In addition, one (or more) of the rotors can have magnetized arms which sweep past a coil and energize a lamp connected thereto.

The invention possesses other objects and features, some of which together with the foregoing, will be set forth in the following detailed description of this invention. The invention will be more fully understood by reading the description with joint reference to the attached drawing, in which:

FIGURE 1 is a perspective which shows the general exterior configuration of a preferred embodiment of the invention;

FIGURE 2 is a sectional view showing greater details of the invention and taken along the line 2—2 as indicated in FIGURE 1;

FIGURE 3 is a plan view of a rotor having magnetized arms which operate in conjunction with a coil to excite a lamp connected thereto;

FIGURE 4 is a top plan view of a rotor having magnetized arms;

FIGURE 5 is a similar top plan view of a rotor in which the magnetized arms are bent near the ends thereof; and FIGURE 6 is another top plan view of a rotor wherein the magnetized arms are bent near the ends in another direction, and a bar magnet is shown near the rotor to illustrate the effect thereof on the rotor.

A preferred embodiment of this invention is shown in FIGURES 1 and 2. FIGURE 1 is a general perspective view of the invention in a configuration which is particularly suited for a demonstration device or educational toy, and FIGURE 2 is a sectional view of the configuration shown in FIGURE 1 as taken along the line 2—2. The toy 10 preferably has a cylindrically shaped base 12 and a central dome 14 as shown in FIGURE 1. Both the base 12 and dome 14 are preferably fabricated from transparent plastic material. Other materials, such as glass, can, of course, be used. However, plastic can be made virtually unbreakable, which is highly desirable in a toy.

As can be seen in FIGURE 2, the dome 14 is a double walled structure forming a comparatively narrow chamber 16 between inner wall 14a and outer wall 14b. The interior surface of chamber 16 can be coated with fluorescent material 16a and is preferably filled with an inert gas such as argon or neon, for example. The inner wall 14a extends down into the base 12 and joins with a bottom, circular plate 18. This forms an inner dome chamber 20. A cylindrical outer wall 22 joining the outer edge of the top, annular plate 24 and that of the bottom plate 18, creates a toroidal chamber 26 about the lower portion of the inner dome wall 14a.

The inner dome chamber 20 houses a pair of pads 28a and 28b which contact the inner wall 14a as shown in FIGURE 2. The pads 28a and 28b can be any of a great variety of materials, including silk, rubber, sulphur, amber, etc. Soft silk pads are preferably used in the embodiment illustrated. The pads 28a and 28b are mounted on the ends of radial shafts 30a and 30b, respectively, diametrically opposite each other. The other ends of the shafts 30a and 30b are secured to cross member 32 which is affixed to a shaft 34. The shaft 34 is journaled and supported by bearing sleeve 36 formed centrally at the top of dome 14 and by an upright, closed ended bearing sleeve 38 formed centrally at the center of the bottom plate 18. The upper end of the shaft 34 is formed into a crank 40, including a handle 42. As the crank 40 is turned, the pads 28a and 28b rotate and rub against the inner wall 14a. Only one pad can be used, or more than two can be employed to generate static electricity on the rubbed structure.

The toroidal chamber 26 is used to house one or more rotors such as rotors 44 and 46. The rotors are each rotatably supported on pointed pivot ends of their respective axles in a corresponding pair of axially aligned pedestals 48a and 48b having conically indented bearing surfaces which engage the pointed ends of a rotor axle. Each of the rotors has a plurality of radial arms 50 emanating from its axle, and such arms 50 can be angularly equally spaced in a plane perpendicular to the rotor axle. The rotors can have magnetized arms, and such rotors can be positioned so that the ends of the arms sweep past the windings of a coil 52 having an electric lamp 54 connected across the ends thereof. This is more clearly shown in FIGURE 3 which is a view taken along the line 3—3 as indicated in FIGURE 2.

The rotors can have magnetized arms which are as indicated in FIGURES 4, 5 and 6. Only four radial arms are shown in these figures; however, a greater or lesser number of arms can be used. Of course, the arms should be equally spaced to provide a balanced rotor, and there should be a sufficient number of arms to produce sustained motion (rotation) of the rotor. In each of FIGURES 4, 5 and 6, the direction of rotation of the pads 28a and 28b is indicated by an arrow 56. The motion of the rotor 58 in FIGURE 2 having straight arms which can have a negative polarity at the ends, is indicated by a small arrow 60. If the ends of the arms are bent clockwise as shown in FIGURE 5, the rotor 58a rotates in a counterclockwise direction as indicated by the small arrow 62. However, if the ends of the arms are bent in a counterclockwise direction as shown in FIGURE 6, the rotor 58b rotates in clockwise direction as indicated by the small arrow 64. A bar magnet 66 is preferably supplied with the toy so that if the negative pole of the magnet 66 is held near the negative ends of the rotor arms, as shown in FIGURE 6, the rotor 58b is caused to rotate in a clockwise direction, thus demonstrating the repelling action of the negative pole on the rotor arms.

The arms of the rotors 58, 58a and 58b can be of magnetized steel wire which is approximately 1/16 inch in diameter, the rotor diameter being approximately 2 inches, for example. The rotor arms can be made from materials other than magnetized matter, of course, but the coil 52 and lamp 54 would be inoperative without the rotating magnetic field. However, some of the other rotors can be fabricated from material forming a non-magnetic rotor which would be unaffected by the proximity of bar magnet 66.

Operation of the toy merely involves the rotation of crank 40 by means of the handle 42. The pads 28a and 28b are rotated about the axis of shaft 34 and rubbed against the surface of the inner wall 14a of the dome 14. Static electricity is thus generated on the structure and causes electrical discharges within the chamber 16. These discharges excite the fluorescent material 16a and produce a fascinating light effect. At the same time, the rotors 44 and 46, for example, are caused to spin on their pivoted axles. The spinning, magnetized arms of rotor 44 induce a voltage in the coil 52 and cause the lamp 54 to light up.

It should be apparent that the toy 10 will provide a varied and interesting display of the effects of static electricity. Since a person operating the apparatus must actually supply the mechanical energy necessary in generating the static electricity, there exists a direct relationship between the operator and the results produced. In this manner, greater curiosity and interest in the phenomena taking place is induced and aroused in the person. In addition, the vivid and binding combinational display of both light and motion is dynamically conveyed to the person. Consequently, the toy 10 is a particularly effective educational device.

From the above description, it will be apparent that there is thus provided a device of the character described possessing the particular features of advantage before enumerated as desirable, but which is obviously susceptible of modification in its form, proportions, detail construction and arrangement of parts without departing from the principles involved or sacrificing any of its advantages.

It is to be understood that the invention is not limited to the specific features shown, but that the means and construction disclosed herein comprise the preferred form of several modes of putting the invention into effect, and the invention is therefore claimed in any of its forms or modifications within the legitimate and valid scope of the appended claims.

I claim:
1. An educational toy, comprising:
   a transparent housing;
   pad means that when rubbed against said housing generate static electricity;
   means on said housing supporting said pad means whereby the latter may be manually rotated within said housing;
   magnetized rotor means rotatably mounted within said housing for rotation solely under the influence of said static electricity;
   a coil within said housing having windings positioned to be swept by said rotor means as the latter rotate, with an electric current thereby being induced in said windings;
   and an electric lamp connected to said coil windings to be illuminated by said current.

2. A toy as set forth in claim 1 wherein said housing includes a double wall portion filled with an inert gas, with a surface of said double wall portion being coated with a fluorescent material that is illuminated by said static electricity.

3. A toy as set forth in claim 1 wherein said housing includes a dome member and a coaxial toroidal base, with said pad means being carried by a coaxial shaft that extends out of the upper end of said dome and is secured to a crank.

References Cited in the file of this patent

UNITED STATES PATENTS

| 2,622,207 | Rich | Dec. 16, 1952 |
| 2,646,516 | Futterknecht | July 21, 1953 |
| 2,856,561 | Giezendanner | Oct. 14, 1958 |

OTHER REFERENCES

Electric Disc and Experiments, W. F. Stanley (author and publisher), 96 pages, 1869.

Early Electrical Machines, Bern Dibner, published by Burndy Library, 57 pages, 1957.